UNITED STATES PATENT OFFICE.

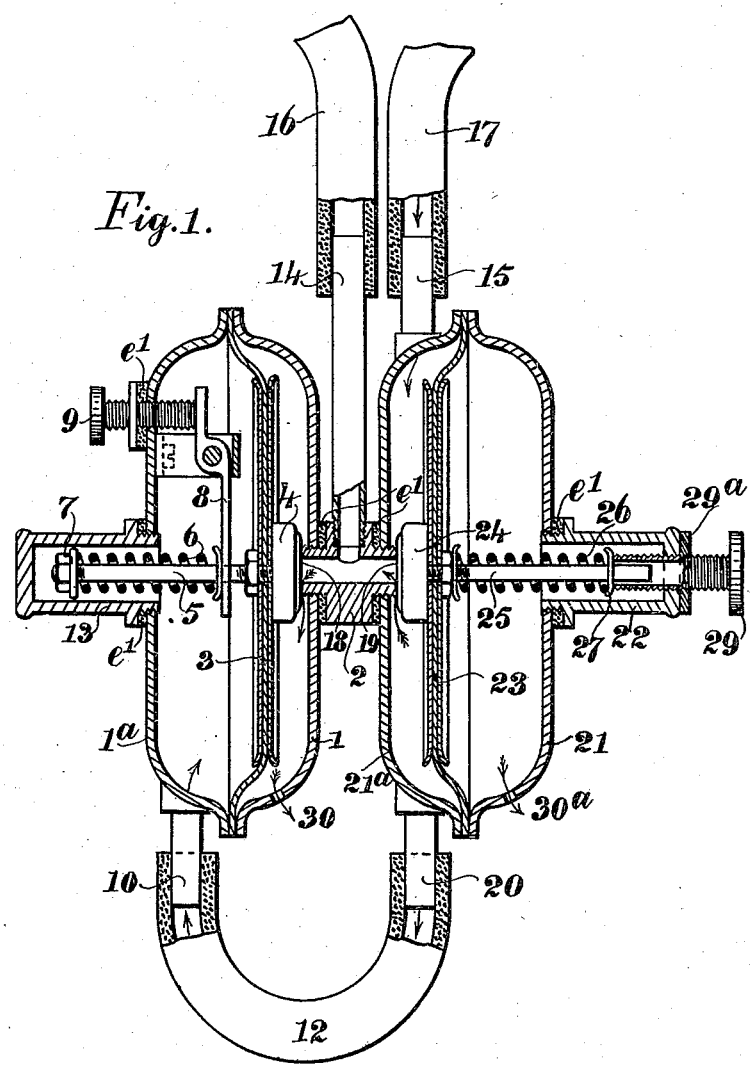

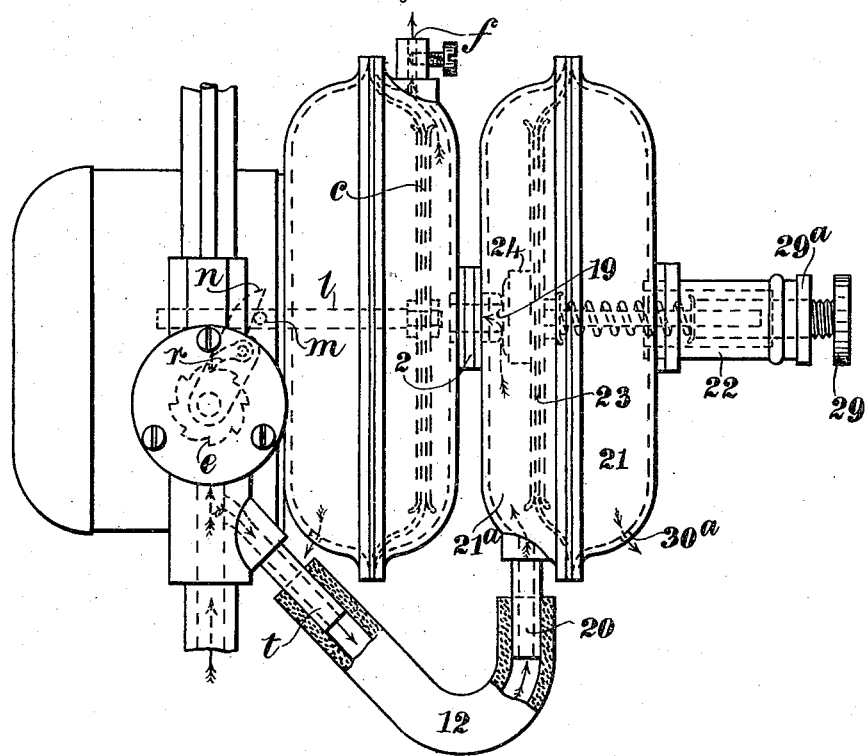

JOHN MESNY TOURTEL, OF LONDON, ENGLAND.

DIAPHRAGM-CONTROLLER FOR GAS-LIGHTING PURPOSES.

966,371.  Specification of Letters Patent. Patented Aug. 2, 1910.

Application filed October 8, 1909. Serial No. 521,689.

*To all whom it may concern:*

Be it known that I, JOHN MESNY TOURTEL, a citizen of the United Kingdom of Great Britain and Ireland, and resident of 57 Chiswell street, London, England, have invented a certain new and useful Diaphragm-Controller for Gas-Lighting Purposes, of which the following is a specification, such as will enable others skilled in the art to which it appertains to make and use the same.

This invention relates to improvements in apparatus for lighting and extinguishing gas lamps from a distance by varying the pressure in the mains and particularly relates to that class of apparatus in which a diaphragm or liquid sealed bell or the like (provided with means for turning on and off the supply of gas to the burner) is connected to the gas supply and is subjected to substantially the full pressure of the gas when a predetermined maximum pressure is reached.

This invention consists in improvements in the means of controlling the admission of the gas to the said diaphragm or liquid sealed bell at the said predetermined maximum pressure.

In carrying out my invention I may employ any convenient means for controlling the discharge of the gas from the diaphragm or bell such as the provision of a small or throttled passage or the employment of a valve or the like which is arranged to effect the discharge at a predetermined minimum pressure. For controlling the admission of the gas to the said diaphragm or liquid sealed bell I employ a diaphragm which I will call the inlet controlling diaphragm fitted in a case which is connected to the gas supply pipe the connection being such that the inlet controlling diaphragm is always under gas pressure. I arrange a spring or weight in conjunction with or connected to the inlet controlling diaphragm in opposition to the gas pressure (the said spring or weight being capable of adjustment) and I furnish the inlet controlling diaphragm with any suitable kind of valve capable of controlling a passage which is formed from the said case to the case containing the tap operating diaphragm, the strength of the spring or weight being such that at any pressure below a predetermined maximum the valve closes the said passage and renders the tap operating diaphragm inoperative. When the pressure in the gas mains is raised to the said maximum the gas acting on the surface of the inlet controlling diaphragm overcomes the pressure of the spring or weight and opens the valve thus allowing the full pressure to pass to the tap operating diaphragm and cause it to move the tap.

In the accompanying drawings:—Figure 1. shows a simple form of the present invention working in conjunction with a discharge controlling diaphragm, and Fig. 2. shows the invention in very similar form as applied to a tap operating diaphragm.

In Fig. 1. the gas supply pipe 17 is connected to the diaphragm case formed of two equal parts 21 and 21$^a$, the gas supply being through inlet pipe 15 between the diaphragm 23 and the side 21$^a$. An outlet pipe 20 is connected by the tube 12 to the inlet pipe 10 attached to the outlet controlling valve case formed of the two parts 1 and 1$^a$ the inlet of gas being between the diaphragm 3 and the side 1$^a$ of the said case. There is a constant pressure of gas from the pipe 17 and the arrangement of the diaphragms and their parts is such that when the gas is under a predetermined maximum pressure the spring 26 arranged around the diaphragm rod 25 of the diaphragm 23 is sufficiently strong to keep the valve 24 close against its seat and thus close the passage 19 of a connecting piece 2 which is shown joining the two valve cases together and from which connecting piece an outlet pipe 14 leading to the tap operating diaphragm or bell by the pipe 16 is connected. The pressure of gas which is conveyed through the aforesaid pipes 20—12—10 to the diaphragm 3 tends to press the said diaphragm with its valve 4 against the end 18 of the passage in the connecting piece 2 and thus seal the same. When the pressure of the gas falls below the power of the tension spring 6 which is regulatable by means of the pivoted lever 8 and finger screw 9 the said spring withdraws the diaphragm 3 with its valve 4 and opens the end of the said passage. It will be obvious therefore, that while the gas is under the predetermined maximum pressure and greater than the predetermined minimum pressure the valves 24 and 4 will be held close against their seats and thus the inlet and escape from the pipe 14 are sealed. Immediately, however, the gas rises to the said maximum pressure it will overcome the spring 26 and press back the diaphragm 23 with the valve 24 and pass through the inlet 19 and the tubes 14 and 16 to the tap operating diaphragm or bell and cause it to move the tap in the required manner. As soon as the pressure is reduced the valve 24 will again close the passage 19 and the tap operating diaphragm or bell cannot be reoperated until the pressure of the gas has fallen sufficiently low for the spring 6 to withdraw the diaphragm 3 with valve 4 from the passage 18 and thus allow the gas to return through pipes 16—14 into the case from which it escapes through the outlet 30. The spring 26 and rod 25 are shown partly arranged in an extension 22 into which a thumb screw 29 having lock nut 29ª is fitted, said thumb screw bearing by plate 27 on the end of the spring 26 for the purpose of varying the pressure of same. An outlet 30ª is made in the case 21 for the free passage of air to accommodate the movements of the diaphragm 23. The rod 5 of the diaphragm 3 is with its spring carried part way into the extension piece 13 and may be regulated by the nut and washer 7 in addition to the means above described. This form of construction is extremely simple and most efficient in working while the cost of production is extremely low as many of the parts are duplicated and it is only necessary to assemble them together with suitable packing such as $e'$ which can be accomplished at a very small expense.

In Fig. 2. an inlet controlling diaphragm very similar to that shown in Fig. 1. is employed but in this case the gas from the main passes through the pipe $t$ connecting tube 12 and tube 20 to between the side 21ª and the diaphragm 23, its action on the said diaphragm being the same as that in the previous figure but in this case after the tap operating diaphragm $c$ has by means of rod $l$ with projecting piece $m$ moved the tap through the lever $n$ carrying the ratchet $r$ which engages with the wheel $e$ the gas is allowed to slowly escape through the passage $f$ which is shown provided with a throttling screw.

Similar reference numbers are used in connection with the inlet controlling diaphragm as in Fig. 1.

The arrangement of the diaphragm cases in the manner shown is one of the most convenient but it is not essential that they should be close together and it will be obvious that the diaphragm 23 with its case and other fittings can be equally well used in conjunction with a liquid sealed bell or equivalent instead of with a diaphragm.

What I claim and desire to secure by Letters Patent is:—

1. In apparatus for controlling gas lamps from a distance, a pipe-connection for a main, a pipe connection for leading to a tap-operating means, a movable diaphragm for supplying gas through the second-named pipe-connection when the pressure exceeds that predetermined, and a second movable diaphragm for permitting escape of gas through said pipe-connection when the pressure falls below that predetermined.

2. In apparatus for controlling gas lamps from a distance, a pair of casings, pipe connections from one casing to the other and to a common point, a movable diaphragm in one casing and a valve controlled thereby for supplying gas through and normally closing said pipe connection at one end, and a movable diaphragm in the other casing and a valve controlled by the last named diaphragm for permitting the escape of gas through and also normally closing the pipe connection aforesaid at its other end.

3. In apparatus for controlling gas lamps from a distance, a pair of casings, a pipe connection from each casing to a common point, a movable diaphragm in one casing and a valve controlled thereby for supplying gas through said pipe connection, means for normally holding the diaphragm to keep the valve in position to close the pipe connection, a pipe for supplying gas to the casing to operate the diaphragm against said means when the pressure exceeds that predetermined, a movable diaphragm in the other casing, a valve, a valve controlled by said diaphragm for permitting escape of gas through said pipe connection, means for normally holding the second diaphragm to keep the second valve in position to open the pipe connection, and a pipe for supplying gas to the second casing to permit the operation of the diaphragm by said opening means when the pressure is below that predetermined.

4. In an apparatus for controlling gas lamps from a distance, a pipe for leading to a tap-operating means, a diaphragm and a valve controlled thereby for admitting gas to said pipe, a second diaphragm and a valve controlled thereby for permitting escape of gas from said pipe, and means for subjecting both diaphragms to pressure in a gas main.

In witness whereof I have hereunto set my hand in presence of two witnesses.

JOHN MESNY TOURTEL.

Witnesses:
H. D. JAMESON,
F. L. RAND.